United States Patent [19]
Saito

[11] Patent Number: 5,760,979
[45] Date of Patent: Jun. 2, 1998

[54] REFLECTING OPTICAL APPARATUS

[75] Inventor: Shuichiro Saito, Yokohama, Japan

[73] Assignee: Canon Kabushiki Kaisha, Tokyo, Japan

[21] Appl. No.: 394,403

[22] Filed: Feb. 24, 1995

[30] Foreign Application Priority Data

Feb. 28, 1994 [JP] Japan ..................... 6-054635

[51] Int. Cl.$^6$ ..................... G02B 5/08; G02B 5/10; G02B 7/182; G02B 23/02
[52] U.S. Cl. ..................... 359/859; 359/858; 359/857; 359/848; 359/366
[58] Field of Search ..................... 359/365, 366, 359/727, 730, 731, 850, 853, 857, 855, 858, 859, 871, 848

[56] References Cited

U.S. PATENT DOCUMENTS

| H783 | 6/1990 | Callender | 359/366 |
|---|---|---|---|
| 3,064,526 | 11/1962 | Lindsay | 359/366 |
| 3,066,569 | 12/1962 | MacDonald | 359/859 |
| 3,229,579 | 1/1966 | Lessley | 359/853 |
| 3,614,449 | 10/1971 | Ward | 359/366 |
| 4,927,251 | 5/1990 | Schoen | 359/366 |
| 5,058,993 | 10/1991 | Wakugawa | 359/896 |
| 5,181,145 | 1/1993 | Eden | 359/366 |
| 5,238,210 | 8/1993 | Heitzmann | 359/850 |
| 5,298,736 | 3/1994 | Dreher et al. | 250/216 |
| 5,400,169 | 3/1995 | Eden | 359/859 |

FOREIGN PATENT DOCUMENTS

| 0794105 | 9/1968 | Canada | 359/848 |
|---|---|---|---|
| 0968025 | 8/1964 | United Kingdom | 359/848 |
| 2077938 | 12/1981 | United Kingdom | 359/848 |

*Primary Examiner*—Ricky D. Shafer
*Attorney, Agent, or Firm*—Robin, Blecker & Daley

[57] ABSTRACT

A mirror optical system includes a main mirror and a sub-mirror which are arranged to oppose each other, and a plurality of columns for coupling the main mirror to the sub-mirror. The main mirror, the sub-mirror, and the columns are constituted by members consisting of the same material, for example, a ceramic material, which has a very small linear expansion coefficient.

7 Claims, 3 Drawing Sheets

REFLECTING OPTICAL APPARATUS

BACKGROUND OF THE INVENTION

1. Field of the Invention

The present invention relates to a mirror optical apparatus and, more particularly, a mirror optical apparatus suitable for an astronomical telescope, a reflecting optical system for optical communication, and the like which are designed such that a main mirror and a sub-mirror which are arranged to oppose each other are fixed/held by a column having a proper shape.

2. Related Background Art

Cassegrain type mirror optical systems, which are designed such that a main mirror having a concave surface, a paraboloid, or the like and a sub-mirror having a convex surface, a hyperboloid, or the like are arranged to oppose each other, have been generally used for astronomical telescopes and optical systems for optical communication.

These Cassegrain type mirror optical systems have large apertures and allow relatively easy setting of long focal distances. A main mirror and a sub-mirror constituting such a mirror optical system are respectively held by holding members and housed in a mirror barrel.

Since the mirror optical system has a long focal distance, a large aperture, and a large size, it is difficult to assemble the system, and the assembly precision is very strict. For this reason, as each constituent element of the mirror optical system, a mechanism which is not influenced by environmental changes such as changes in ambient temperature and humidity, exhibits a little change in quality over time, and sufficiently resistant to vibrations, an impact, and the like during transportation is required. Conventionally, therefore, a mirror barrel for holding a main mirror and a sub-mirror is made of a material having a small thermal expansion coefficient, e.g., Zerodure (tradename used by Shot).

If, however, a mirror barrel is used to hold optical members, since the overall mirror optical system is large in size, the total weight of the system becomes large. This makes it difficult to handle the system. In addition, if the mirror barrel is made of a material having a small thermal expansion coefficient, e.g., Zerodure, the mirror barrel easily cracks upon reception of vibrations or an impact. This makes it difficult to handle the mirror barrel.

SUMMARY OF THE INVENTION

It is an object of the present invention to provide a mirror optical apparatus which realizes a reduction in total weight and acquires a structure resistant to vibrations and an impact by properly setting holding portions for holding the respective optical elements of a mirror optical system having a main mirror and a sub-mirror.

According to the present invention, there is provided a mirror optical apparatus having a main mirror and a sub-mirror which are arranged to oppose each other and coupled to each other via a plurality of columns, characterized in that the main mirror, the sub-mirror, and the columns are constituted by members consisting of the same material.

Especially, the apparatus is characterized in that the sub-mirror is held by a sub-mirror holding portion, the sub-mirror holding portion is supported by a sub-mirror base plate coupled to the columns, and the members consist of a brittle material exhibiting brittle fracture.

In addition, there is provided a mirror optical apparatus having a main mirror and a sub-mirror which are arranged to oppose each other and coupled to each other via a plurality of columns, characterized in that a ring portion which is to be integrally coupled to the main mirror and a sub-mirror base portion for fixing/holding the sub-mirror are integrally formed on the columns, and the main mirror, the sub-mirror, and the columns are constituted by members consisting of the same material.

Especially, the apparatus is characterized in that the members consist of a brittle material exhibiting brittle fracture.

DETAILED DESCRIPTION OF THE PREFERRED EMBODIMENTS

Figure 1:
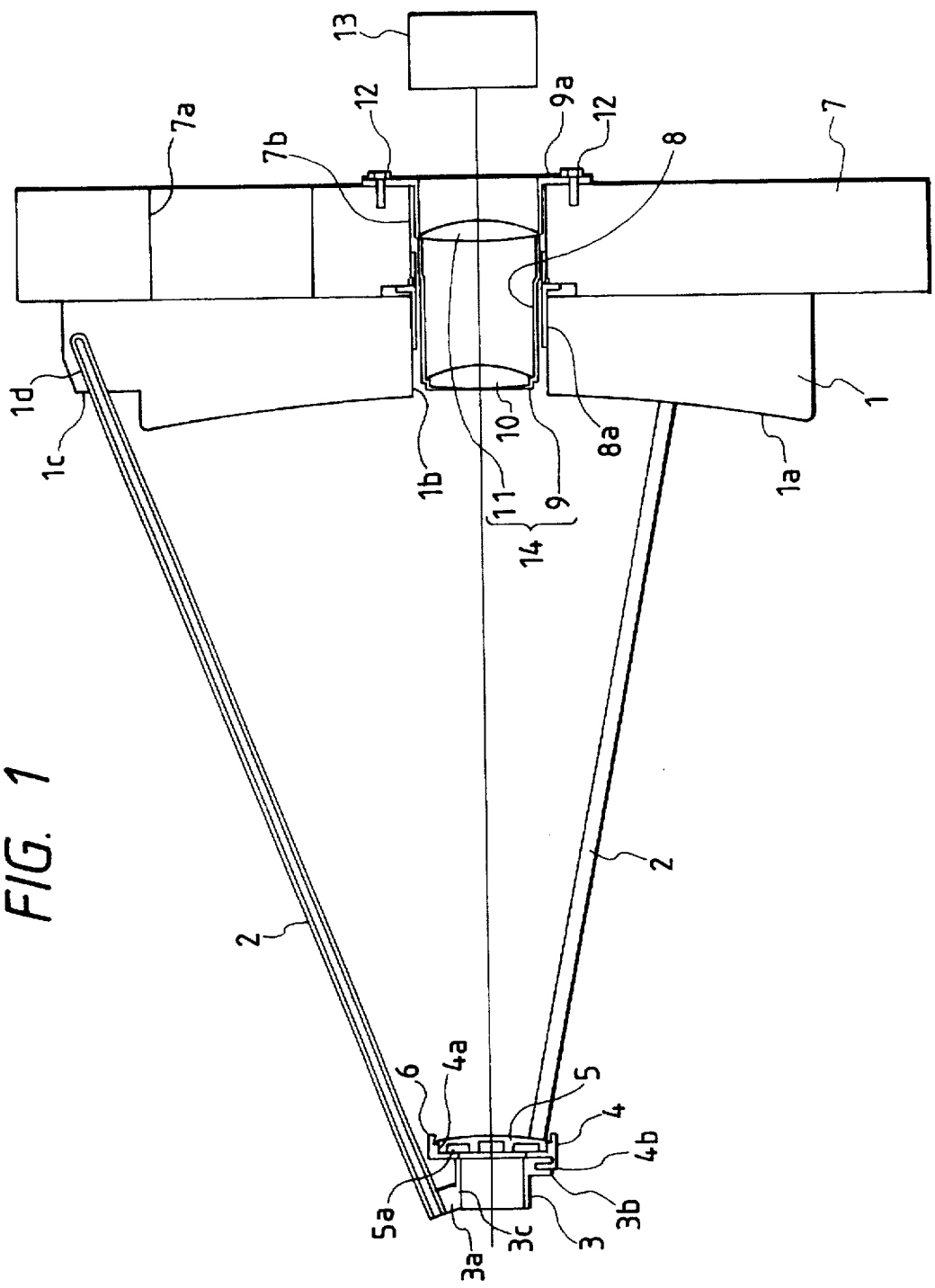
FIG. 1 is a sectional view showing the main portion of the first embodiment of the present invention.
Figure 2:
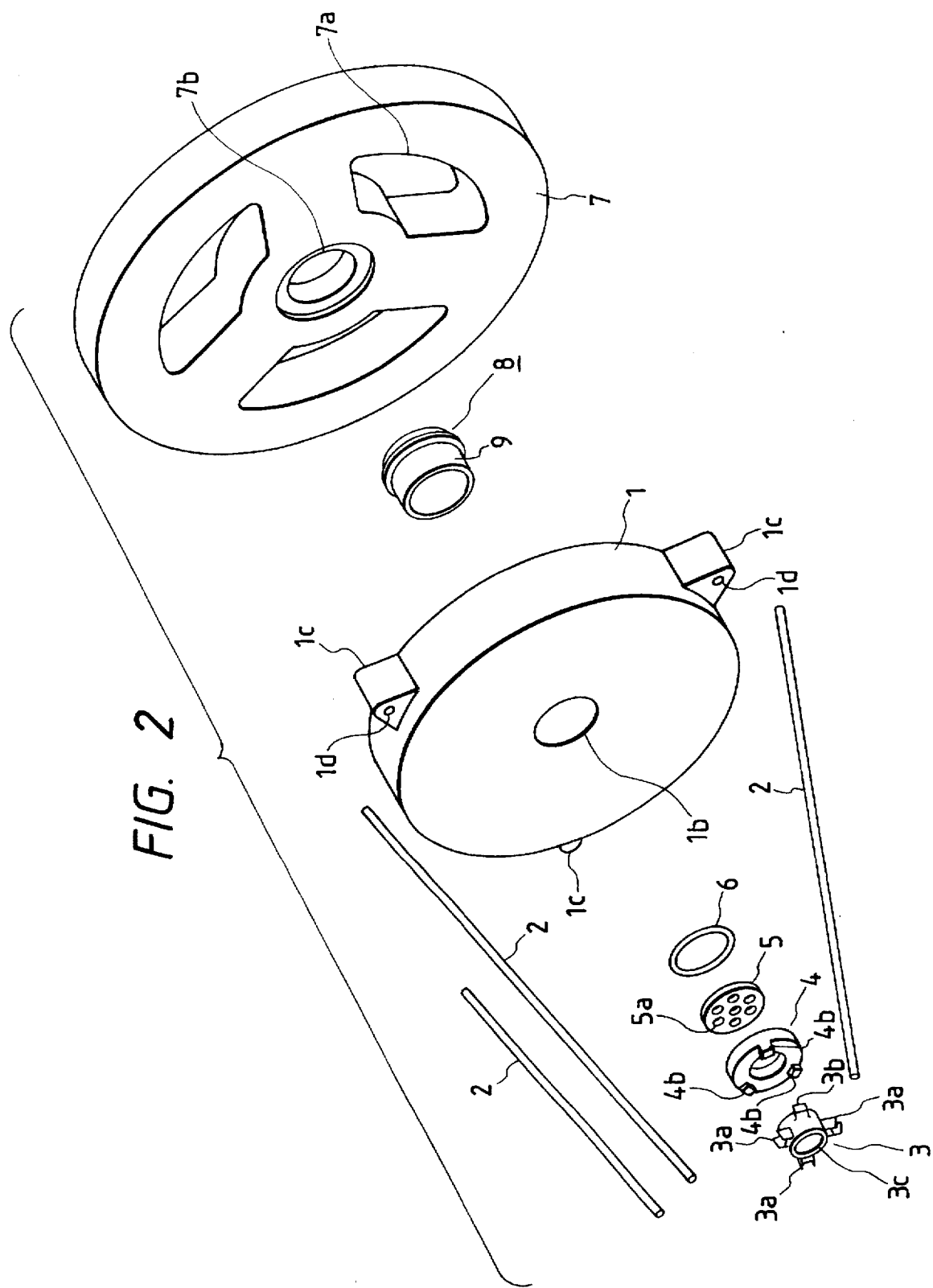
FIG. 2 is a perspective view showing the main portion of the first embodiment of the present invention.

FIG. 1 is a sectional view showing the main portion of the first embodiment of the present invention. FIG. 2 is a perspective view showing the main portion in FIG. 1.

Referring to FIGS. 1 and 2, a main mirror 1 is constituted by a paraboloid and has a reflection amplifying film formed on its reflecting surface. An opening portion 1b is formed in a predetermined area including the optical axis of the main mirror 1. A collimator lens system 14 (to be described later) is fitted in the opening portion 1b. Projections 1c are formed on the outer circumferential portion of the main mirror 1 at equal angular intervals of 120°. Holes 1d are respectively formed in the projections 1c to allow columns 2 to be fitted therein. Each column 2 is a hollow round rod having a spherical end on the main mirror 1 side. The column 2 may also have an I-shaped cross-section or the like which has a large geometrical moment of inertia.

The reflecting surface of a sub-mirror 5 is constituted by a convex surface or hyperboloid, which opposes the main mirror 1. A reflection amplifying film is formed on the reflecting surface of the sub-mirror 5 which opposes the main mirror 1. A plurality of thinning holes 5a are formed in the rear surface (on the opposite side to the main mirror 1) of the sub-mirror 5 to reduce the weight.

The sub-mirror 5 is fitted in a recess 4a of a sub-mirror holding portion 4, and the sub-mirror 5 is fixed by a tension ring 6 having a threaded portion on its outer circumferential portion. Three fixing portions 4b are formed in the outer portion of the sub-mirror holding portion 4 at equal angular intervals of 120°. Each fixing portion 4b is a U-shaped portion.

A sub-mirror base plate 3 holds the sub-mirror 5 together with the sub-mirror holding portion 4. An opening portion 3c is formed in the central portion of the sub-mirror base plate 3 to reduce the weight and improve the working efficiency. Three U-shaped recesses 3a and three fixing portions 3b each having a U-shaped cross-section are formed on the circumferential surface portion of the sub-mirror base plate 3 at equal angular intervals of 120°. The columns 2 are respectively fitted in the recesses 3a. The fixing portions 3b of the sub-mirror base plate 3 are respectively fitted in the fixing portions 4b of the sub-mirror holding portion 4 to be coupled to each other.

A base plate 7 serves to hold the main mirror 1. The base plate 7 is constituted by a honeycomb plate or the like having a face plate consisting of the same material as that for the main mirror 1, a material having a low thermal expansion coefficient, e.g., super invar, a ceramic material, or CFRP. A plurality of hole portions 7a are formed in the base plate 7 to reduce the weight and improve the working efficiency. An opening portion 7b is formed in the central portion of the base plate 7. The collimator lens system 14 having two lenses 10 and 11 and held by a holding mirror barrel 9 is fitted in the opening portion 7b.

A main mirror support barrel 8 has one end portion 8a designed to fitted in the opening portion 1b in the center of the main mirror 1. The main mirror 1 is coupled/bonded to one end portion 8a. The main mirror support barrel 8 is fixed in the opening portion 7b. The apparatus also includes an optical transmission/reception unit 13.

An external light signal is sequentially transmitted through the main mirror 1, the columns 2, and the collimator lens system 14 to be guided to the optical transmission/reception unit 13. An optical signal from the optical transmission/reception unit 13 is sequentially transmitted through the collimator lens system 14, the sub-mirror 5, and the main mirror 1 to be transmitted to another apparatus.

A method of assembling and adjusting each element in this embodiment will be described next.

First of all, the main mirror 1 and the sub-mirror base plate 3 are fixed by jigs (not shown) according to a predetermined positional relationship. The columns 2 are fixed in the holes 1d in the projections 1c of the main mirror 1 and the U-shaped recesses 3a of the sub-mirror base plate 3 by using a proper adhesive, brazing, or solvent welding. The sub-mirror 5 is fitted in the recess 4a of the sub-mirror holding portion 4 and fixed by the tension ring 6 in advance.

The U-shaped fixing portions 4b of the sub-mirror holding portion 4 and the U-shaped fixing portions 3b of the sub-mirror base plate 3 are fitted to each other with small gaps being ensured therebetween and attached to a jig.

Subsequently, a proper adhesive is applied to the gaps between the fixing portions 3b and the fixing portions 4b, and the distance between the main mirror 1 and the sub-mirror 5, their inclinations and eccentricities, and the like are adjusted before the adhesive is hardened. The main mirror 1 and the sub-mirror 5 are held in this state until the adhesive is hardened. When the adhesive is hardened, the assembly and adjustment are completed. Instead of the adhesive, a low-melting solder may be used. In this case, the fixing portions 3b and the fixing portions 4b have undergone known surface treatment such as chemical nickel plating or metallization.

The main mirror 1 is bonded/fixed to the base plate 7 via the main mirror support barrel 8. The holding mirror barrel 9 holding the collimator lens system 14 is fitted in the opening portion 1b of the main mirror 1 and the opening portion 7b of the base plate 7 and fixed to the base plate 7 with screw portions 12 via a flange 9a.

In the above arrangement, each member consists of a glass material having a low thermal expansion coefficient, a ceramic glass material (a glass material such as ULE (tradename used by Corning) or Zerodure (tradename used by Shot)), or the like so as not be easily influenced by temperatures and humidities to maintain a predetermined optical performance for a long period of time. In addition, the same material may be used for the columns 2, the sub-mirror base plate 3, the sub-mirror holding portion 4, the tension ring 6, and the like, and a high-modulus ceramic material (e.g., silicon nitride) or the like may be used.

If a small deformation is left on each member upon application of vibrations, acceleration, or an impact, the positional relationship between the main mirror and the sub-mirror changes, resulting in a deterioration in optical performance. Therefore, each member preferably consists of a material exhibiting brittleness in accordance with environmental changes such as changes in the operating temperature and transportation temperature of the apparatus. If a brittle material is used, the strength of the member is lower than that of a member consisting of a metal material (e.g., an aluminum or iron alloy often used for an optical apparatus). However, almost no residual strain is left in this member after an applied stress is removed, thereby allowing high-precision assembly.

Figure 3:
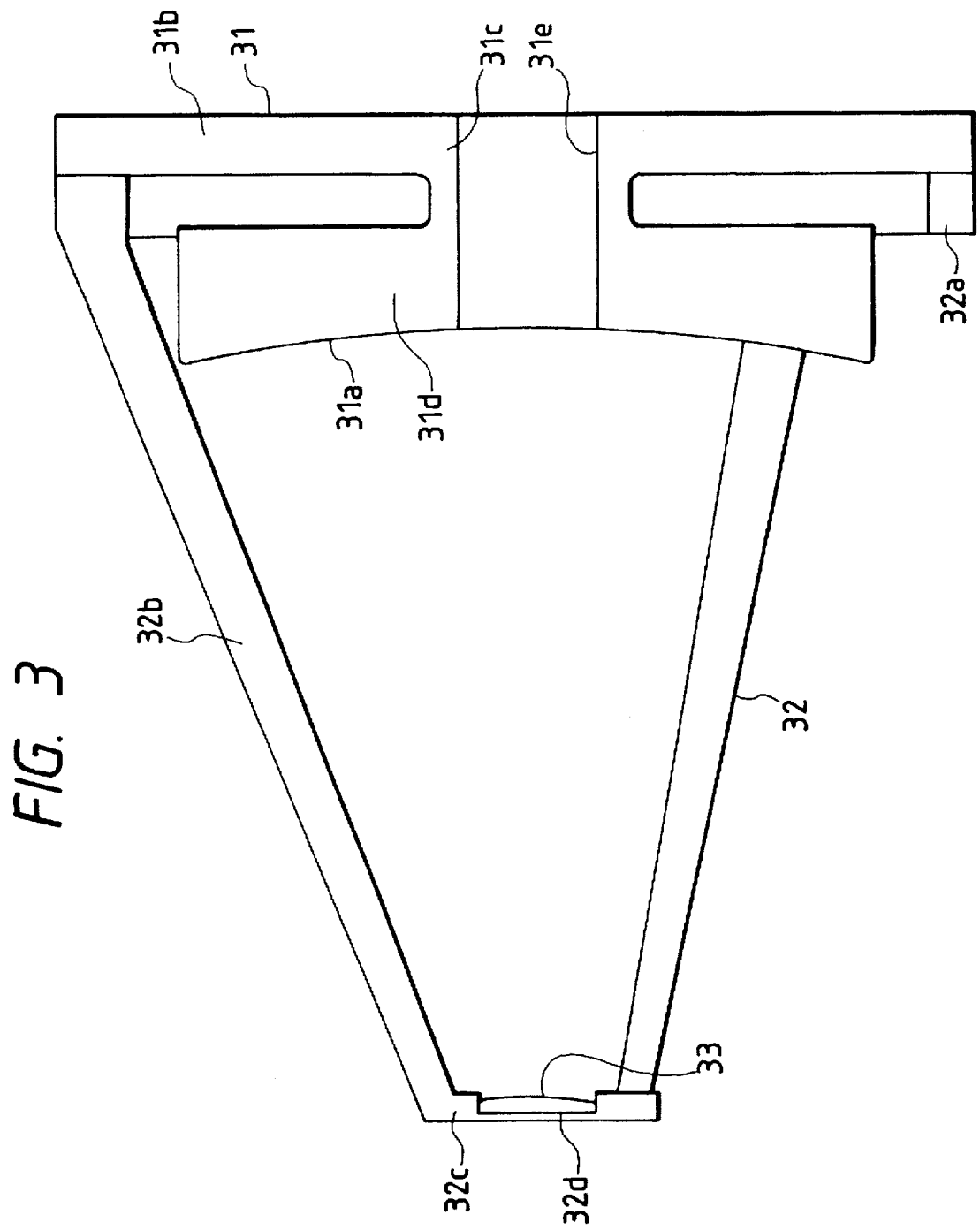
FIG. 3 is a sectional view showing the main portion of the second embodiment of the present invention.

FIG. 3 is a sectional view showing the main portion of the second embodiment of the present invention. Referring to FIG. 3, a main mirror 31 has a reflecting surface 31a constituted by a paraboloid. A base portion 31b is coupled to a mirror portion 31d via a pillar portion 31c. These members are integrally formed. A hole (opening portion) 31e is formed in the center of the main mirror 31. The hole 31e is the same as the opening portion in the first embodiment.

A sub-mirror support member 32 has an annular ring portion 32a for with the main mirror 31. Three column portions 32b are arranged at equal angular intervals of 120°. Each column portion 32b has a rectangular cross-section. A recess 32d is formed in the center of a disk-like sub-mirror base portion 32c. A sub-mirror 33 is arranged in the recess 32d. The sub-mirror support member 32 is integrally formed.

A method of assembling and adjusting the respective elements of this embodiment will be described next. First of all, the overall apparatus is temporarily assembled, and the relative positions of the sub-mirror 33 and the main mirror 31 are measured. The left side surface (rear surface) of the sub-mirror 33 in FIG. 3 is polished to correct its inclination, and the sub-mirror 33 and the sub-mirror base portion 32c are fixed to each other with an adhesive.

Temporary assembly is performed again, and the distance between the main mirror 31 and the sub-mirror 33 is measured. The joined surface (right end face in FIG. 3) between the ring portion 32a and the base portion 31b is then polished to perform correction.

The ring portion 32a and the base portion 31b are fixed with an adhesive. A material having a small thermal expansion coefficient is preferably used for the main mirror 31, the sub-mirror support member 32, and the sub-mirror 33. In this embodiment, a glass material having a small thermal expansion coefficient, a ceramic material, or the like is used. In addition, the column portions 32b preferably has a cross-sectional shape having a high flexural rigidity. An I-shaped cross-section may be applied to the column portions 32b. Since the deflection of the column portions 32b due to its own weight is preferably reduced, the central portion of the column portions 32b may be removed to have a hollow structure.

As has been described above, according to the present invention, there is provided a mirror optical apparatus which realizes a reduction in total weight and acquires a structure resistant to vibrations and an impact by properly setting holding portions for holding the respective optical elements of a mirror optical system having a main mirror and a sub-mirror.

Especially, since the sub-mirror is supported by the columns, this structure is highly resistant to acceleration, vibrations, and an impact, as compared with a structure using a cylindrical mirror barrel or the like. In addition, if the overall apparatus is made of a glass material having a low thermal expansion coefficient, a glass ceramic material having a low thermal expansion coefficient, or a ceramic material, a mirror optical apparatus which is stable with respect to environmental changes (changes in temperature and humidity), exhibits little residual strain upon application of vibrations, an impact, or acceleration, and can maintain the excellent optical performance for a long period of time can be realized.

What is claimed is:

1. A mirror optical system comprising:

a main mirror and a sub-mirror which are arranged to oppose each other; and a plurality of columns for coupling said main mirror to said sub-mirror, wherein a ring portion which is to be integrally coupled to said main mirror and a sub-mirror base portion for holding said sub-mirror are integrally formed on said columns, and said main mirror, said sub-mirror, and said columns are constituted by members consisting of the same material, said columns being joined with said ring portion and said sub-mirror base portion perimetrically outwardly of said main mirror and said sub-mirror.

2. A system according to claim 1, wherein said material is of a type whereby said members exhibit low residual strain following removal of applied stress.

3. A system according to claim 1, wherein said material has a low coefficient of thermal expansion.

4. A system according to claim 1, wherein the said material is of a type whereby said members exhibit low structural change with changes in humidity.

5. A system according to claim 1, wherein the said material exhibits a high degree of brittleness.

6. A mirror optical system comprising:

a main mirror and a sub-mirror which are arranged to oppose each other;

a main mirror base portion for supporting said main mirror and having a part disposed perimetrically outwardly of said main mirror;

a sub-mirror base portion for supporting said sub-mirror and having a part disposed perimetrically outwardly of said sub-mirror; and a plurality of columns for coupling said main mirror to said sub-mirror, each of said columns being joined with each of said parts of said main mirror base portion and said sub-mirror base portion so as to provide unobstructed optical communication between said main mirror and said sub-mirror, said sub-mirror base portion and said columns being integrally formed, wherein said main mirror, said sub-mirror, and said columns are constituted by members consisting of the same material.

7. A system according to claim 6, wherein said material is a non-metallic material.

* * * * *